(12) United States Patent
Latham, II et al.

(10) Patent No.: US 6,873,203 B1
(45) Date of Patent: Mar. 29, 2005

(54) INTEGRATED DEVICE PROVIDING CURRENT-REGULATED CHARGE PUMP DRIVER WITH CAPACITOR-PROPORTIONAL CURRENT

(75) Inventors: Paul W. Latham, II, Lee, NH (US); John C. Canfield, Newmarket, NH (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/689,183

(22) Filed: Oct. 20, 2003

(51) Int. Cl.[7] .............................................. G05F 1/10
(52) U.S. Cl. ...................................................... 327/538
(58) Field of Search ................................ 327/538, 108; 363/59; 323/350, 353

(56) References Cited

U.S. PATENT DOCUMENTS

| | | | |
|---|---|---|---|
| 4,899,430 A | 2/1990 | Farino | |
| 5,570,421 A | 10/1996 | Morishima | 379/396 |
| 6,297,621 B1 | 10/2001 | Hui et al. | 323/222 |
| 6,304,467 B1 | 10/2001 | Nebrigic | 363/49 |
| 6,320,470 B1 * | 11/2001 | Arai et al. | 331/17 |
| 6,603,342 B2 | 8/2003 | Liao et al. | 327/487 |
| 2002/0105487 A1 | 8/2002 | Inoue | 345/82 |

OTHER PUBLICATIONS

Maxim Integrated Products datasheet, MAX682, MAX683, MAX684, "3.3V–Input to Regulated 5V–Output Charge Pumps", 19–0177; Rev. 1, Aug. 1998.

Fairchild Semiconductor datasheet, FAN5609, "LED Driver with Adaptive Charge Pump DC/DC Converter", Rev. 1.0.2, May 30, 2003.

Tyco Electronics Corporation datasheet, RYC9901, "High–Power Mulit–LED Boost", SCD 25493, Rev. B, Jul. 24, 2003.

Israel Schleicher, "LED Drive Delivers Constant Luminosity", Electronic Design News, p. 88, Jun. 12, 2003.

* cited by examiner

*Primary Examiner*—Shawn Riley

(57) ABSTRACT

An integrated circuit regulates current flowing from a battery to a load without requiring an external current sense resistor. The IC includes a primary charge pump; a model charge pump; a current sense circuit, a first control circuit to force a voltage level at the output of the model charge pump to be equal to a voltage level at the output of the primary charge pump; and, a second control circuit to force a model current put out by the model charge pump to be equal to a reference current. Current passing through the primary charge pump is regulated at a level established by the capacitance value of an external flying capacitor irrespective of input voltage variation of the battery power source.

21 Claims, 3 Drawing Sheets

INTEGRATED DEVICE PROVIDING CURRENT-REGULATED CHARGE PUMP DRIVER WITH CAPACITOR-PROPORTIONAL CURRENT

BACKGROUND OF THE INVENTION

Field of the Invention

The present invention relates to integrated circuit components adapted to surface mount technology. More particularly, the present invention relates to an integrated circuit including a current regulated charge pump wherein the magnitude of the output current is adjusted via scaling of a single external charge pump capacitor.

INTRODUCTION TO THE INVENTION

Battery operated appliances have proliferated throughout the world. Cell phone handsets, portable radios and playback units, personal digital assistants, light emitting diode (LED) flashlights, and wireless security and remote control systems provide only a few of many examples of such appliances. Small batteries of the types commonly employed in these appliances typically do not put out either constant current or constant voltage. In order for output loads, such as LEDs to be supplied with constant current, feedback regulation techniques are employed. Regulation may be as simple as a ballast resistor or as complex as an integrated circuit with feedback control.

LEDs typically require a supply voltage potential which frequently exceeds the voltage potential supplied by a particular cell or low voltage battery. For example, white LEDs have a forward voltage of 3.5 volts typical, and 4.0 volts maximum, at a current of 20 milliamperes (mA), whereas a single-cell lithium battery delivers approximately 3.6 volts and two alkaline cells in series deliver approximately 3.0 volts. In this circumstance, a voltage converter is typically employed to boost the voltage to a level suitable for supplying the LED.

One example of a known integrated circuit boost converter IC1 is given in FIG. 1. In this example, the boost converter IC1 may be a type RYC 9901 high-power multi-LED boost converter supplied by Tyco Electronics Corporation, the assignee of the present invention, or equivalent. This circuit IC1 may be operated from a battery B comprising a single lithium cell or two alkaline cells in series, and is capable of driving up to 8 LEDs in series, two LEDs D1 and D2 being shown in FIG. 1. In normal operation, IC1 operates as a discontinuous conduction mode non-isolated flyback converter.

When an NMOS transistor switch M1 is conducting, current from battery B flows into an external inductor L1 and a magnetic field develops. When the switch M1 is turned off, current flows out of the inductor, through an external Schottky diode SD1 and into a storage capacitor C2. When the storage capacitor C2 is charged, current at a higher voltage than supplied from the battery B passes through one or more series-connected light emitting diodes D1, D2 and a current sense resistor R1 providing a feedback control signal to IC1. An input filter capacitor C1 may be provided. As shown in FIG. 1, IC1 may also include internal elements including amplifiers U1 and U2, AND gate G1, latch LA1 and an internal current sense resistor R2, connected as shown.

Another known way to generate constant current for a load, such as an LED, is to employ a charge pump circuit topology. For example, a type MAX684 voltage regulated charge pump, supplied by Maxim Integrated Products, Inc., Sunnyvale, California, can power three or more white color LEDs. The MAX684 charge pump regulator generates 5 volts from a 2.7V to 4.2V input, but requires a ballast resistor or current source for each LED as well as external capacitors. The ballast resistors lower the efficiency of the driver by the large voltage drop needed. In order to control brightness, Maxim suggests that an external switching transistor controlled by a PWM brightness control be employed.

With reference to FIG. 2A, a single charge pump voltage doubler/inverter representative of the prior art is shown. A DC voltage applied across terminals 1 and 2 becomes stored in an input charge store, such as capacitor Ci. When switches S1 and S2 are closed, the charge is transferred from input capacitor Ci to a so-called "flying" capacitor Cf in accordance with a current flow Ia. Switches S1 and S2 are opened, and a potential now appears across the flying capacitor Cf. Then, switches S3 and S4 are closed, and the charge across the flying capacitor, Cf is transferred to an output charge store, such as capacitor Co. Switches S3 and S4 are opened, and the charge across the output store Co is available to be supplied to a load. It is important to the proper operation of the charge pump shown in FIG. 2A that the switch pairs S1–S2 and S3–S4 are closed during non-overlapping clock intervals. Accordingly, a clock circuit generates a first switch phase PHI 1 (applied to control S1 and S2) and a second, non-overlapping switch phase PHI 2 (applied to control S3 and S4) as shown in FIG. 2B. (In practice actual clock non-overlap is less than as graphed in FIG. 2B.) If terminal 4 is connected to terminal 1, a voltage doubler results. If terminal 3 is connected to terminal 2, a voltage inverter results. When the switches S1, S2, S3 and S4 are true MOS switches, they permit current to flow in either direction when closed, thereby allowing energy transfer from output to input as well as from input to output. While this prior topology has worked satisfactorily, like the FIG. 1 inductor-based solution, the prior charge pump solution has typically required an external sense resistor to regulate and maintain a constant current flow through the external load.

A hitherto unsolved need has arisen to provide a single, integrated circuit driver which uses a charge pump topology in which magnitude of output current to a load is adjusted by the scaling of capacitance of a single external flying capacitor and maintained at the scaled level, in a manner overcoming limitations and drawbacks of the prior art.

BRIEF SUMMARY OF THE INVENTION

A general object of the present invention is to provide an electronic circuit for driving a load with a constant current irrespective of variations in supply voltage within a supply voltage range.

Another object of the present invention is to provide an electronic circuit comprising a current regulated charge pump wherein magnitude of output current is established by selecting the value of an external flying capacitor.

Yet another object of the present invention is to provide an electronic driver circuit for delivering a constant output current over a range of input voltage, based upon a dual charge pump circuit topology enabling comparison of a model charge pump current set by an internal flying capacitor with output current put out by a primary charge pump, such that regulated output current is set by selecting the value of an external flying capacitor within the primary charge pump circuit arrangement.

Still one more object of the present invention is to provide a low-cost, high frequency charge pump integrated circuit for driving one to four super-bright LEDs, for example, with a constant current over an input voltage range usually present with battery power supplies and without need for any external current sense resistor.

Yet one more object of the present invention is to provide a low-cost six-pin current regulated charge pump driver IC with external enable and user settable regulated drive current, which can be fabricated using known low-cost CMOS IC processes.

As one aspect of the present invention, an electrical system is provided for regulating electrical current flowing from a power source to a load. In this particular aspect, the electrical system includes the following interconnected structural elements. A current pass regulator element is connectable to the power source and functions to control supply current drawn from the power source. A primary voltage multiplying finite output resistance circuit has an input connected to the current pass regulator element and an output connectable to the load. The primary voltage multiplying finite output resistance circuit includes a user settable output resistance determining element for determining magnitude of output resistance. In a preferred embodiment, the current determining element comprises a flying capacitor within a primary charge pump circuit. A model voltage multiplying finite output resistance circuit includes an input connected to the current pass regulator element and provides an output to a current sense circuit that supplies an output current equal to model voltage multiplying circuit output current (Imodel). A constant current source sinking a reference current (Iref) is connected to the current sense output. The current sense circuit forces the output of the model voltage multiplying circuit to be equal to the primary voltage multiplying circuit output. Thus, both the primary and model voltage multiplying circuits enjoy the same terminal voltages, or operating point. Therefore, the ratio of the primary voltage multiplying circuit output current to the model voltage multiplying circuit output current is fixed by the multiplying circuit designs, and not by the terminal voltages. In a preferred embodiment, this ratio is established as a ratio between capacitance of an internal capacitor to capacitance of an external capacitor. A control circuit controls the current pass regulator element to force the current Imodel to be equal to the reference current Iref. In this manner current passing through the primary voltage multiplying finite output resistance circuit is regulated at a level established by the user settable current determining element irrespective of input voltage variation of the power source. A related aspect of the present invention provides an integrated circuit for regulating electrical current flowing from a battery power source to a load without requiring an external or internal current sense resistor. This related aspect is realized by using a model charge pump that "mirrors" the primary charge pump to generate a scaled copy of the output current. The two charge pumps are controlled in unison, so that the scaled model current is fixed by an internal current reference. Thus, the primary charge pump output current is stabilized without any sense resistor.

As a further aspect of the present invention, a method is provided for regulating current flowing from a battery to a load without directly sensing current flow at the load. In this aspect of the present invention, the method includes the following steps:

(a) passing current from the battery through a current pass regulator element, (b) providing current from the current pass regulator element to a primary voltage multiplying finite output resistance circuit providing current flow to the load, (c) selecting a value for a user settable output resistance determining element of the primary voltage multiplying finite output resistance circuit in order to determine magnitude of regulated current to flow to the load, (d) providing current from the current pass regulator element to a model voltage multiplying finite output resistance circuit in order to generate a model current Imodel, (e) passing the model current through a current sense element, and into a constant current source for sinking a reference current Iref, and (f) controlling the current pass regulator element to force the current Imodel to be equal to the reference current Iref, such that current passing through the primary voltage multiplying finite output resistance circuit is regulated at a level established by the user settable current determining element irrespective of input voltage variation of the power source.

These and other objects, advantages, aspects and features of the present invention will be more fully understood and appreciated upon consideration of the detailed description of preferred embodiments presented in conjunction with the following drawings.

DETAILED DESCRIPTION OF THE INVENTION

Figure 3:
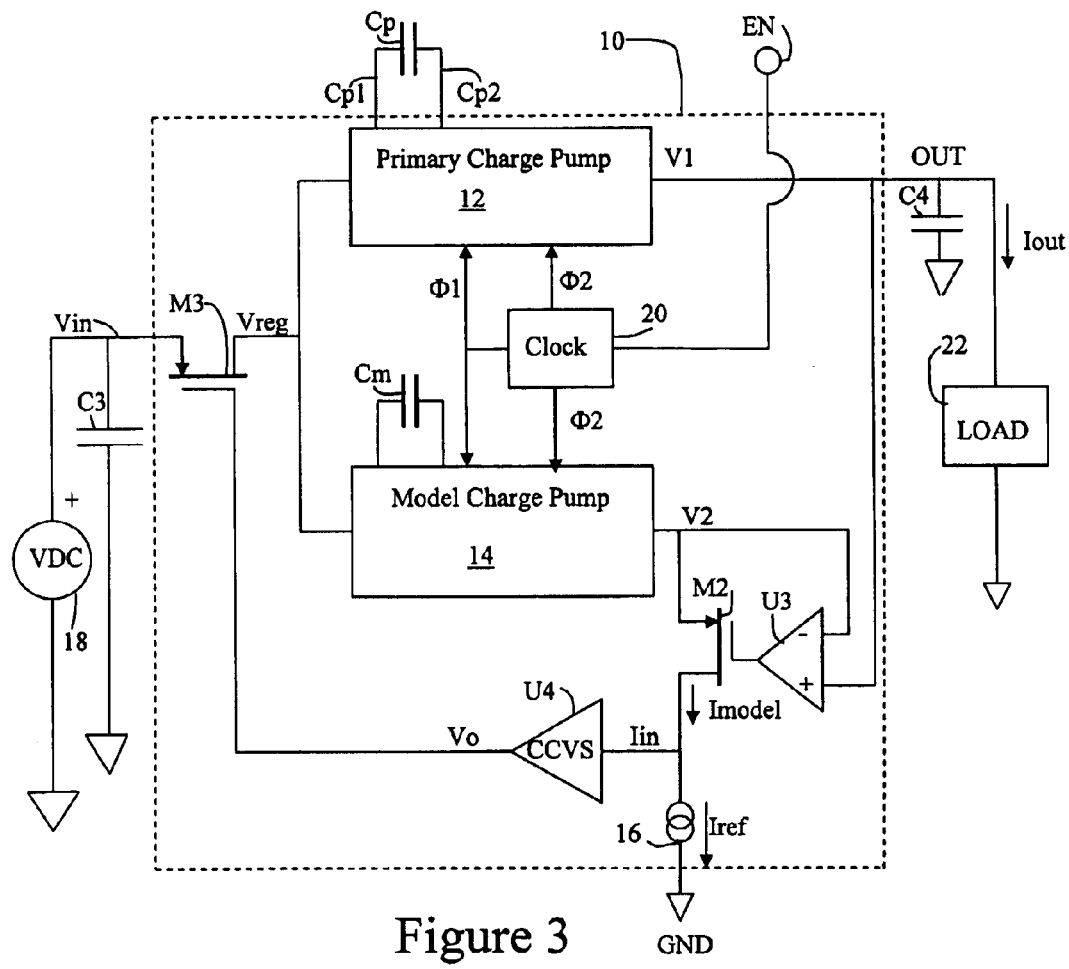
FIG. 3 is a block and schematic circuit diagram of an integrated circuit forming a charge pump driver for a load in accordance with principles of the present invention.
Figure 4:
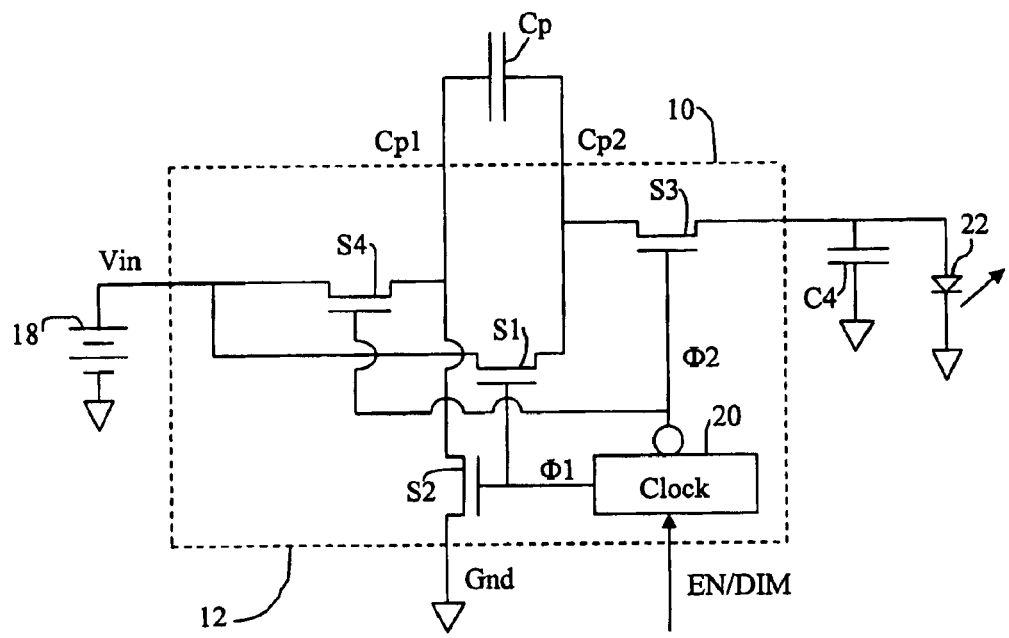
FIG. 4 is a more detailed diagram illustrating the primary charge pump architecture and clock included within the FIG. 3 block and schematic circuit diagram.

In accordance with principles of the present invention, and as shown in the circuit of FIG. 3, an integrated circuit 10 implements a current regulated charge pump wherein the magnitude of output current is adjustable by scaling of the capacitance value of a single external flying capacitor Cp. The IC 10 includes two charge pumps, namely a primary charge pump 12 and a model charge pump 14. While the primary charge pump 12 may have any switching topology, it most preferably is in accordance with the FIG. 4 arrangement, having internal connections to form a voltage doubler. While the circuit topology must be the same for both the primary charge pump 12 and the model charge pump 14, the actual circuit layouts may be scaled so long as the primary charge pump 12 operates proportionally with respect to the model charge pump 14, with the nominal current put out by the primary charge pump 12 being set by a user-selected, externally connected flying capacitor Cp. By making the primary charge pump 12 electrically proportional to the model charge pump 14, the model charge pump 14 can be operated at far less current than that used and sourced by the primary charge pump 12, and take up far less integrated circuit die area.

The primary charge pump 12 utilizes the externally connected capacitor Cp as its flying capacitor, whereas the model charge pump 14 utilizes an internal capacitor Cm formed on the integrated circuit chip as its flying capacitor. The primary charge pump 12 has an output V1 that forms the OUT path for the IC 10. The model charge pump 14 has an output V2. A voltage amplifier U3 (having finite gain) subtracts the V2 output from the V1 output to provide a difference voltage. The circuit U3 may be implemented in a variety of manners including, but not limited to, an operational amplifier or a PMOS differential pair. The difference voltage put out by U3 is applied to a control gate electrode of a PMOS transistor M2. The PMOS transistor M2 is connected in series between the model charge pump output V2 and a constant current source 16 that sinks a constant current Iref to ground. The circuit elements U3 and M2 form a current sense circuit that forces V2 to be approximately the same as the output voltage on OUT. The current required to achieve this is Imodel, the output current from the model charge pump 14.

A series pass regulator element, represented in the FIG. 3 block diagram as a PMOS transistor M3, is provided to adjust the input drive level from a DC supply 18, such as a lithium battery, to the primary charge pump 12 and the model charge pump 14. An input capacitor C3 minimizes voltage drops at the input of the IC 10 in response to high frequency switching operations occurring within the charge pumps 12 and 14. An output capacitor C4 acts to filter out any switching transients otherwise remaining in the output current supplied by IC 10.

A current controlled voltage source U4 has an input connected to a node between the drain electrode of PMOS transistor M2 and the constant current source 16, and has an output connected to a gate control electrode of the pass element PMOS transistor M3. The circuit U4 functions as a current-to-voltage converter and generates a voltage control as a function of current imbalance between Imodel and Iref sensed at its input. The voltage control is applied to a control gate electrode of the pass element M3 such that the current Imodel passing through the PMOS transistor M2 is forced to remain equal to the internal fixed reference current Iref generated by constant current source 16. If Imodel is greater than Iref, excess current present at the input of U4 is sinked to ground through U4 and the voltage control to M3 causes input current to be reduced. If Imodel is less than Iref, additional current is sourced by U4 to the constant current source 16 and the voltage control to M3 causes input current to the charge pumps to be increased. This regulation process operates automatically to maintain Imodel equal to Iref.

Figure 1:
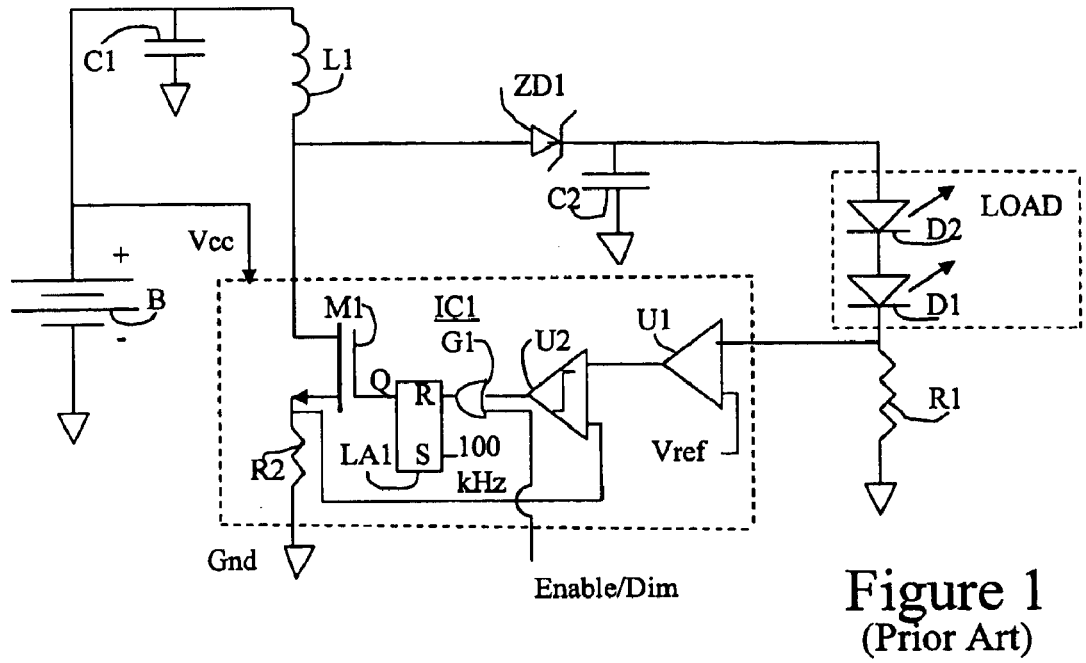
FIG. 1 is a block and schematic circuit diagram of a conventional integrated circuit boost converter for driving a load to a current level monitored by an external resistor and feedback connection.
Figure 2A:
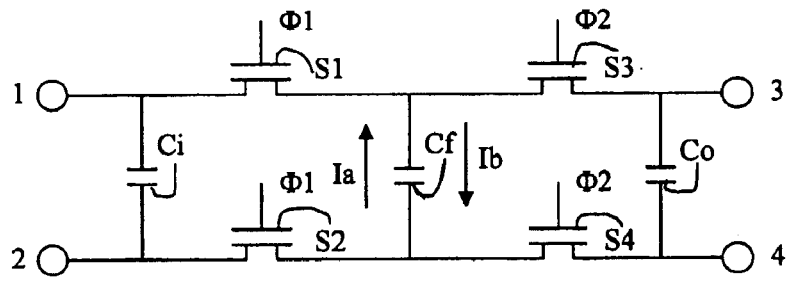
FIG. 2A is a simplified schematic circuit diagram of a capacitor-based charge pump known in the prior art.
Figure 2B:
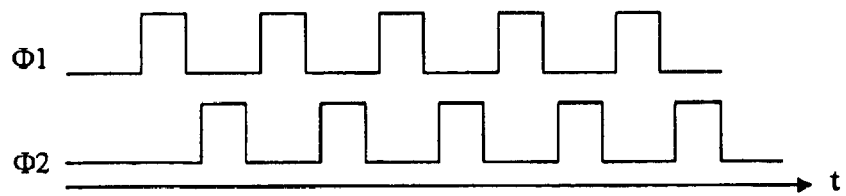
FIG. 2B is a graph of two-phase clock waveforms drawn along a common horizontal time base.

The integrated circuit 10 includes an internal clock element 20 which generates the non-overlapping switching signals Phi 1 (i.e. Φ1) and Phi 2 (i.e. Φ2) shown in FIG. 2B at a suitable clock frequency, such as 1.2 MHz for example, and applies them simultaneously to control the primary charge pump 12 and the model charge pump 14. A true logical level at the enable pin EN of IC 10 enables the circuitry to generate and put out regulated current Iout to a load 22. The load may be any desired load, particularly but not necessarily one or more super-bright LEDs. A low frequency pulse width modulator (PWM) signal applied to the enable pin EN turns the IC 10 on and off, thereby modulating the output current and dimming the LED light level, for example. For example, applying a 1 KHz PWM signal with a duty cycle of 700 microseconds results in a light level which is 70% of the maximum drive level set by the external switched capacitor Cp.

Figure 5:
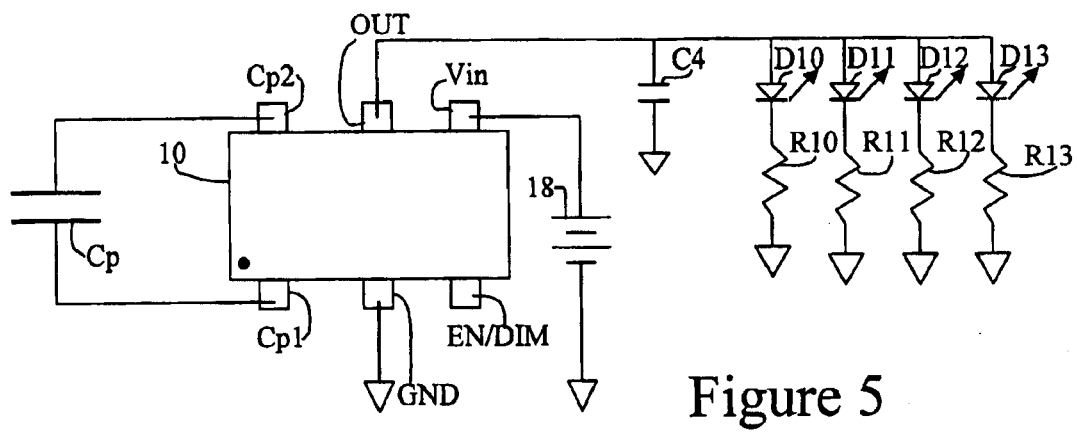
FIG. 5 is a greatly enlarged top plan view of a miniature surface-mount integrated circuit package including the FIG. 3 IC circuitry in accordance with principles of the present invention.

Multiple LEDs may be connected in series or in parallel. If connected in parallel, current equalization series resistors or ballast resistors may be utilized to balance current flows and light outputs of the multiple LEDs, given a range of manufacturing tolerances. If several super-bright LEDs are to-be driven, output light level matching considerations may require small ballast resistors. These resistors can typically be smaller and more efficient than the fixed output voltage design techniques employed in the prior art discussed hereinabove. For example, FIG. 5 shows four super-bright LEDs D10, D11, D12, and D13, each LED having a series current equalization resistor R10, R11, R12 and R13 selected to make light output of diodes D1–D4 uniform.

Since the input voltage Vreg output by the pass element PMOS transistor M3 is common to both the primary charge pump 12 and the model charge pump 14, and the output voltages of both charge pumps are forced to be equal, the output current produced by the model charge pump 14 is a scaled replica of the output current produced by the primary charge pump 12. The output current Iout can be expressed as follows:

$$Iout = \frac{Cp}{Cm} Imodel$$

Since the circuit U4 forces the current Imodel to be equal to the reference current Iref, the output current can be expressed as follows:

$$Iout = \frac{Cp}{Cm} Iref = CpK$$

Since the constant K is fixed by appropriate design of the integrated circuit 10, the regulated output current Iout can be scaled by selecting the capacitance value of the external flying capacitor Cp. In normal operation, the IC 10 delivers a constant current to the load, regardless of actual input voltage within an operational range.

For example, over an input voltage range of 1.6 to 3.4 volts, a 100 nanofarad (nF) capacitor Cp results in approximately 30 mA of output current, a 47 nF capacitor Cp results in approximately 20 mA of output current, a 22 nF capacitor results in approximately 15 mA of output current, and a 10 nF capacitor results in approximately 5 mA of output current, from IC 10. With a switching frequency of 1.2 MHz, full current is reached in approximately four microseconds from first assertion of the enable signal.

IC 10 is most preferably fabricated using known low-cost CMOS IC processes. As shown in FIG. 5, IC 10 may be contained in a small package having only six external pins: Cp1 (pin 1), ground (pin 2), enable (pin 3), Vin (pin 4), OUT (pin 5) and Cp2 (pin 6). Preferably, although not necessarily, the package may comprise an industry standard surface-mount SOT-23-6 package having a nominal length of 3.0 mm, a width (exclusive of pins) of 1.67 mm and a height of 1.35 mm, for example. With the arrangement shown, there is no need for, nor provision for, any external sense resistor or pin therefore.

Thus, it will be appreciated that the present invention provides a charge pump based driver integrated circuit 10 providing constant current regulation, user settable by selection of an external flying capacitance value, with a wide current range extending to 100 mA, or more. The circuit 10 operates with a wide input voltage range, for example 1.6 volts to 5.0 volts. When non-enabled in shutdown mode, the circuit 10 draws as little as 2 μA. The circuit 10 enable may be pulse width modulated so as to provide a ten to one linear dimming range for LEDs. Applications for the integrated circuit 10 include, but are clearly not limited to, driving super-bright LED flashlights, battery-powered indicator lights, cell phone display panel back lighting, keyless entry systems, wireless security systems, automatic meter readers, etc.

Having thus described a preferred embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. Therefore, the disclosures and descriptions herein are purely illustrative and are not intended to be in any sense limiting.

What is claimed is:

1. An electrical system for regulating electrical current flowing from a power source to a load, the electrical system comprising:
   (a) a current pass regulator element connectable to the power source to control supply current drawn from the power source,
   (b) a primary voltage multiplying finite output resistance circuit having an input connected to the current pass regulator element and an output connectable to the load, and having a user settable regulated current determining element for determining magnitude of regulated current to flow to the load,
   (c) a model voltage multiplying finite output resistance circuit including an input connected to the current pass regulator element and an output supplying a model current Imodel,
   (d) a current sense circuit connected to force an output voltage of the model voltage multiplying finite output resistance circuit to be equal to an output voltage of the primary voltage multiplying finite output resistance circuit,
   (e) a constant current source for sing a reference current Iref, and
   (f) a control circuit responsive to the current sense circuit and the constant current source and connected to control the current pass regulator element to force the model current Imodel to be equal to the reference current Iref, such that current passing through the primary voltage multiplying finite output resistance circuit is regulated at a level established by the user settable current determining element irrespective of input voltage variation of the power source.

2. The electrical system set forth in claim 1 including a non-overlapping two phase clock generator and wherein the primary voltage multiplying finite output resistance circuit comprises a first charge pump clocked by the clock generator and wherein the user settable regulated current determining element comprises a flying capacitor having a capacitance value selected by the user to establish regulated output current level.

3. The electrical system set forth in claim 2 wherein the model voltage multiplying finite output resistance circuit comprises a second charge pump clocked in synchronism with the first charge pump.

4. The electrical system set forth in claim 3 wherein the current sense circuit comprises a voltage comparison circuit having a first input connected to monitor output voltage of the primary voltage multiplying finite output resistance circuit, having a second input connected to monitor output voltage of the model voltage multiplying finite output resistance circuit, and having a voltage comparison output; and, a model current regulator responsive to the voltage comparison output and connected to force the output voltage of the model voltage multiplying finite output resistance circuit to be equal to the output voltage of the primary voltage multiplying finite output resistance circuit.

5. The electrical system set forth in claim 4 wherein the model current regulator of the current sense circuit is connected in series with the constant current source, and wherein the control circuit comprises a current controlled source having an input connection to a node between the model current regulator and the constant current source for sourcing and sinking current to maintain model current Imodel equal to reference current Iref and having an output connected to control current passing through the current pass regulator element.

6. The electrical system set forth in claim 5 wherein the current pass regulator element comprises a voltage controlled current regulator, and wherein the current controlled source comprises a current controlled voltage source for outputting a voltage control.

7. The electrical system set forth in claim 4 wherein the model current regulator comprises a metal oxide semiconductor field effect transistor.

8. The electrical system set forth in claim 6 wherein the voltage controlled current regulator comprises a metal oxide semiconductor field effect transistor.

9. The electrical system set forth in claim 1 formed as a monolithic integrated circuit chip without the user settable regulated current determining element and having external connections to the power source, load and user settable regulated current determining element.

10. The electrical system set forth in claim 9 having an additional external connection to an enable signal.

11. The electrical system set forth in claim 9 contained in a six-pin integrated circuit package comprising a power source pin, a ground return pin, a load pin, an enable pin, and two pins for connecting the user settable regulated current determining element.

12. The electrical system set forth in claim 11 wherein the package conforms to an industry-standard SOT-23 package convention.

13. The electrical system set forth in claim 1 wherein the power source comprises a battery and the load comprises at least one light emitting diode.

14. An integrated circuit formed in accordance with a complementary metal oxide silicon process for regulating electrical current flowing from a battery power source to a load without requiring an external current sense resistor, the integrated circuit comprising:
   (a) a current pass regulator element connectable to the battery power source to control supply current drawn from the power source,
   (b) a primary charge pump having an input connected to the current pass regulator element and an output connectable to the load, and having pin connections to an external flying capacitor, the value of the external flying capacitor selected to fix magnitude of regulated current to flow to the load,
   (c) a model charge pump having an input connected to the current pass regulator element and a model output supplying a model current Imodel, and including a current sense circuit, and a constant current source for sinking a reference current Iref, wherein the current sense circuit is connected and functions to compare voltage levels at the outputs of the primary and model charge pumps and to force voltage level at the output of the model charge pump to be equal to a voltage level at the output of the primary charge pump, and (d) a control circuit having a current sourcing/sinking input connected to a node between the current sense circuit and the constant current source and having a control output connected to control the current pass regulator element to force the current Imodel to be equal to the reference current Iref, such that current passing through the primary charge pump is regulated at a level established by the capacitance value of the flying capacitor irrespective of voltage variation of the battery power source.

15. The integrated circuit set forth in claim 14 wherein the current pass regulator element comprises a voltage controlled current regulator, and wherein the control circuit comprises a current controlled voltage source for outputting a voltage control to control the voltage controlled current regulator.

16. The integrated circuit set forth in claim 14 contained in a six-pin integrated circuit package including a power source pin, a ground return pin, a load pin, an enable pin, and two pins for connecting the external flying capacitor.

17. The integrated circuit set forth in claim 15 wherein the package conforms to an industry-standard SOT-23 package convention.

18. The integrated circuit set forth in claim 14 wherein the load comprises at least one light emitting diode.

19. A method for regulating current flowing from a battery to a load without directly sensing current flow at the load, comprising the steps of:

(a) passing current from the battery through a current pass regulator element, (b) providing current from the current pass regulator element to a primary voltage multiplying finite output resistance circuit providing regulated current flow to the load, (c) selecting a value for a user settable output resistance determining element of the primary voltage multiplying finite output resistance circuit in order to determine magnitude of regulated current to flow to the load, (d) providing current from the current pass regulator element to a model voltage multiplying finite output resistance circuit in order to generate a model current Imodel, (e) passing the model current through a current sense circuit, and into a constant current source for sinking a reference current Iref, (f) controlling the current sense circuit to force a voltage level at the output of the model voltage multiplying finite output resistance circuit to be equal to a voltage level at the output of the primary voltage multiplying finite output resistance circuit, and, (g) controlling the current pass regulator element to force the current Imodel to be equal to the reference current Iref, such that current passing through the primary voltage multiplying finite output resistance circuit is regulated at a level established by the user settable current determining element irrespective of input voltage variation of the power source.

20. The method set forth in claim 19 wherein the step of providing current from the current pass regulator element to a primary voltage multiplying finite output resistance circuit comprises providing current to a primary charge pump, wherein the step of providing current from the current pass regulator element to a model voltage multiplying finite output resistance circuit comprises providing current to a model charge pump, and wherein the step of selecting a value for a user settable output resistance determining element comprises selecting a capacitance value of an external flying capacitor in order to determine magnitude of regulated current flow to the load.

21. The method set forth in claim 19 for regulating current flowing to a load comprising at least one light emitting diode.

* * * * *